US011117562B2

(12) United States Patent
Adeeb et al.

(10) Patent No.: US 11,117,562 B2
(45) Date of Patent: Sep. 14, 2021

(54) HYDRAULIC VALVE MODULE AND METHOD FOR SUPPLYING HYDRAULIC PRESSURE TO CIRCUITS OF A VEHICLE

(71) Applicant: Caterpillar SARL, Geneva (SE)

(72) Inventors: Adam Adeeb, Seaham (GB); Steven Johnson, Metamora, IL (US)

(73) Assignee: Caterpillar SARL, Geneva (CH)

( * ) Notice: Subject to any disclaimer, the term of this patent is extended or adjusted under 35 U.S.C. 154(b) by 181 days.

(21) Appl. No.: 16/574,122

(22) Filed: Sep. 18, 2019

(65) Prior Publication Data

US 2021/0078553 A1     Mar. 18, 2021

(51) Int. Cl.
*B60T 13/12*     (2006.01)
*B60T 1/00*     (2006.01)

(52) U.S. Cl.
CPC .............. *B60T 13/12* (2013.01); *B60T 1/005* (2013.01)

(58) Field of Classification Search
CPC ........ B60T 1/005; B60T 8/343; B60T 8/4031; B60T 13/12; B60T 13/686; B60T 8/368; B60T 13/22; B60T 13/32; B60T 13/662; F04B 53/00
USPC .......... 188/353; 180/6.48, 308; 60/424, 445; 801/33.6, 33.9, 34.4
See application file for complete search history.

(56) References Cited

U.S. PATENT DOCUMENTS

| 6,470,247 | B1 * | 10/2002 | Meyer ................... F16H 61/12 |
| | | | 701/33.6 |
| 6,874,857 | B2 | 4/2005 | Tanabe |
| 7,178,334 | B2 | 2/2007 | Beck |
| 2013/0069423 | A1 * | 3/2013 | Rowan .................... B60T 13/22 |
| | | | 303/2 |
| 2017/0036656 | A1 * | 2/2017 | Stoops ................. B60T 13/686 |

FOREIGN PATENT DOCUMENTS

| CN | 202720500 | 2/2013 |
| DE | 4303205 | 8/1994 |
| JP | 2006009272 | 1/2006 |
| JP | 2010213604 | 9/2010 |

* cited by examiner

*Primary Examiner* — Robert A. Siconolfi
*Assistant Examiner* — San M Aung

(57) ABSTRACT

A first valve module (4000) includes a valve block and circuits for controlling hydraulic pressure to parking brake and differential lock actuation circuits of a vehicle. An extension flowpath (4010) has an extension inlet and outlet opening respectively through an interface surface and further external surface of the valve block. A second module (1000) may be connected to supply a first service brake circuit, the circuits of the first module, and, via a second service brake outlet communicating with the extension inlet, a second service brake circuit. In a method, first and second valve blocks with internal flowpaths formed respectively by machining and by casting are assembled together with valves to define valve modules (4000, 1000) having respective, first and second functional circuits. The first valve block includes an extension flowpath. The second module supplies pressure to the first functional circuit and the extension flowpath of the first module.

7 Claims, 6 Drawing Sheets

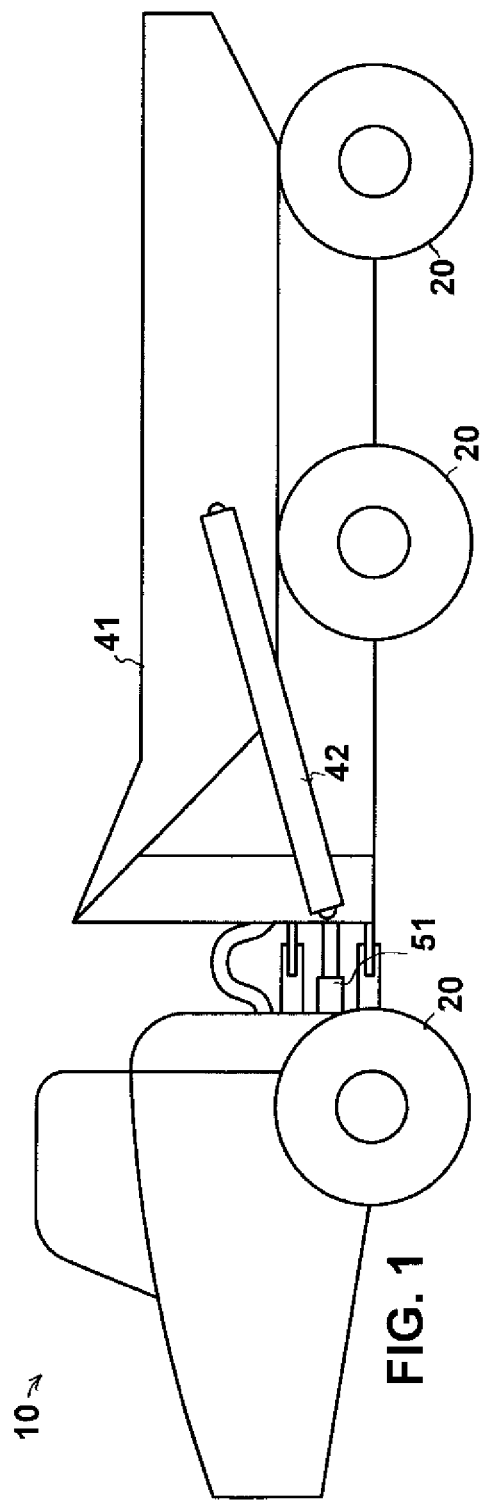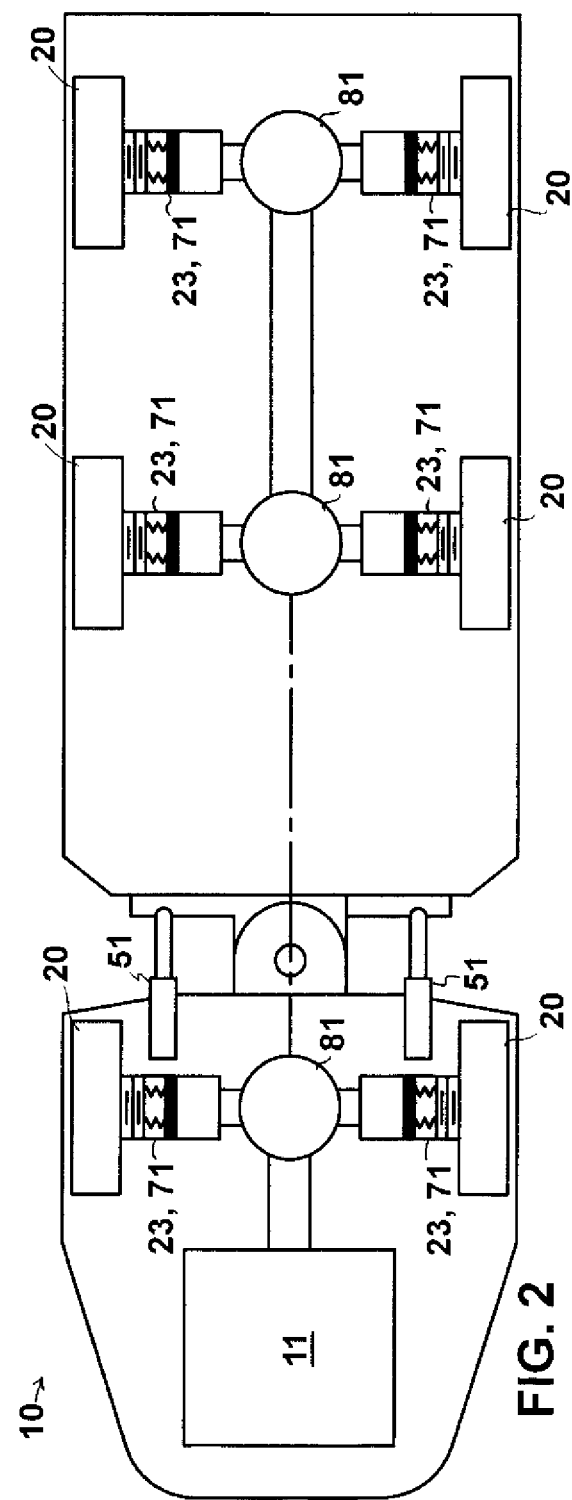

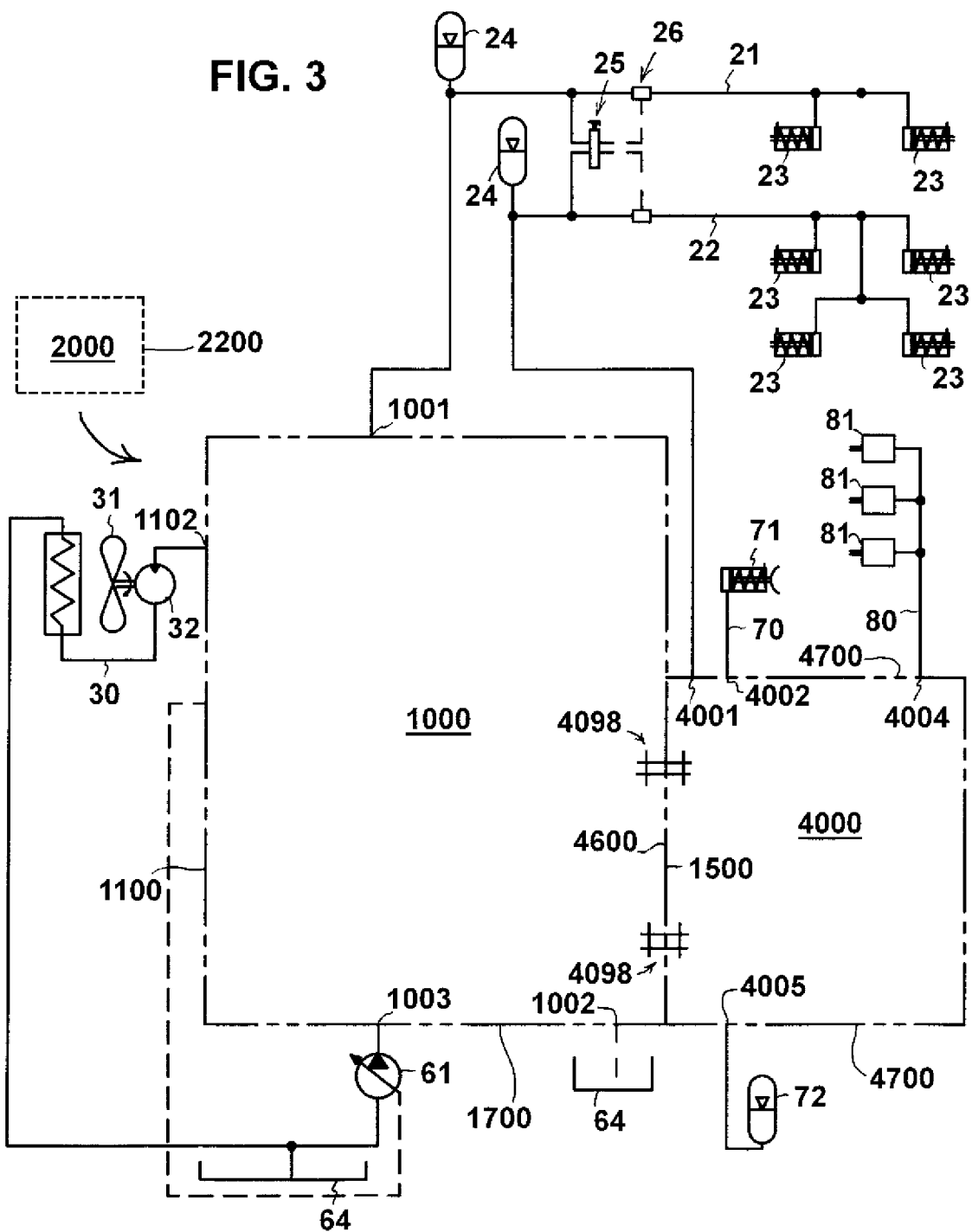

HYDRAULIC VALVE MODULE AND METHOD FOR SUPPLYING HYDRAULIC PRESSURE TO CIRCUITS OF A VEHICLE

TECHNICAL FIELD

This disclosure relates to modular valve assemblies and methods for supplying hydraulic pressure to operate a parking brake, differential lock, and other functional hydraulic units of a vehicle.

BACKGROUND

It is known to build a hydraulic valve assembly from modules based on monolithic blocks. Each valve block defines internal flowpaths which open through ports formed in flat interface surfaces and other external surfaces of the block. By connecting two or more blocks together with their interface surfaces in abutting relation the ports are placed in fluid communication so that the hydraulic circuits of the different blocks are functionally interconnected.

It is known to form the internal flowpaths of each block by casting or by machining. Machining makes it possible to adapt the valve block to accommodate different connection layouts in different vehicles, but at the cost of reduced hydraulic efficiency since machining limitations will impose practical constraints on the configuration of the internal flowpaths.

By way of example, US 2016/0317956 A1 discloses a tracked mining shovel having a modular valve assembly supplying a plurality of hydraulic circuits from a plurality of hydraulic pumps. The valve assembly includes filter modules, junction modules for combining the flow via two of the filter modules from two of the pumps, and valve modules operable to direct the flow from the junction modules, selectively to actuate either or both of the bucket and the tracks.

SUMMARY

In a first aspect, the present disclosure provides a hydraulic valve module for use in supplying hydraulic pressure to a parking brake actuation circuit and a differential lock actuation circuit in a vehicle.

The module includes a plurality of valves, an electrical connector for receiving a parking brake actuation signal, and a monolithic valve block, the valve block having a plurality of internal flowpaths, an external interface surface, and at least one further external surface.

The valves are arranged in fluid communication with respective ones of the internal flowpaths to define a parking brake control circuit, and a differential lock supply circuit.

The parking brake control circuit includes a parking brake pressure inlet, a parking brake accumulator inlet, a parking brake control outlet, a drain flowpath, a parking brake control valve, a parking brake pressure reducing valve, and a solenoid actuated parking brake pilot valve.

The parking brake pressure inlet opens through the interface surface for receiving a supply of hydraulic pressure.

The parking brake accumulator inlet is in uninterrupted fluid communication with the parking brake pressure inlet and opens through the at least one further external surface for connecting a hydraulic accumulator to the supply of hydraulic pressure from the parking brake pressure inlet.

The parking brake control outlet opens through the at least one further external surface for supplying the hydraulic pressure from the parking brake pressure inlet to the parking brake actuation circuit of the vehicle.

The drain flowpath opens through a drain outlet in the interface surface to relieve the hydraulic pressure from the parking brake pressure inlet to tank.

The parking brake control valve is operable to connect the parking brake control outlet, selectively to the hydraulic pressure from the parking brake pressure inlet, and to the drain flowpath.

The parking brake pressure reducing valve is configured to reduce the hydraulic pressure from the parking brake pressure inlet supplied via the parking brake control valve to the parking brake control outlet.

The solenoid actuated parking brake pilot valve is operable to connect an actuator inlet of the parking brake control valve, selectively to the hydraulic pressure from the parking brake pressure inlet, and to the drain flowpath, responsive to an electrical parking brake actuation signal received via the electrical connector.

The differential lock supply circuit includes: a differential lock pressure inlet, opening through the interface surface for receiving a supply of hydraulic pressure; a differential lock supply outlet, opening through the at least one further external surface for supplying the hydraulic pressure from the differential lock pressure inlet to the differential lock actuation circuit of the vehicle; and a differential lock pressure reducing valve configured to reduce the hydraulic pressure supplied from the differential lock pressure inlet to the differential lock supply outlet.

The interface surface is sealingly connectable to a corresponding surface of another valve module.

The internal flowpaths further include an extension flowpath which opens through an extension inlet in the interface surface and an extension outlet in the at least one further external surface. The extension inlet is in uninterrupted fluid communication with the extension outlet via the extension flowpath.

The internal flowpaths of the valve block may be formed by machining.

In a development, a hydraulic valve apparatus may include a first hydraulic valve module as described above, and a second hydraulic valve module.

The second hydraulic valve module includes a plurality of valves, and a monolithic second valve block, the second valve block having a plurality of internal flowpaths, an external interface surface, and at least one further external surface.

The first and second valve modules are connectable together in a connected configuration in which the respective interface surfaces are sealingly engaged together.

The internal flowpaths of the second hydraulic valve module include a pressure source flowpath, a differential lock pressure supply flowpath, and a tank flowpath.

The pressure source flowpath opens through a pressure source inlet in the at least one further external surface of the second valve block for receiving a supply of hydraulic pressure.

The differential lock pressure supply flowpath is in fluid communication with the pressure source flowpath and opens through a differential lock pressure outlet arranged in the interface surface of the second valve block to fluidly communicate with the differential lock pressure inlet of the first hydraulic valve module in the connected configuration.

The tank flowpath opens through a tank outlet in the at least one further external surface of the second valve block and through a tank inlet in the interface surface of the second valve block, the tank inlet being arranged to fluidly communicate with the drain outlet of the first hydraulic valve module in the connected configuration to relieve hydraulic pressure to tank when a tank is connected to the tank outlet.

The valves of the second hydraulic valve module are arranged in fluid communication with respective ones of the internal flowpaths of the second hydraulic valve module to define a parking brake supply circuit, and a service brake supply circuit.

The parking brake supply circuit is configured to supply the hydraulic pressure from the pressure source flowpath to a parking brake pressure outlet, and to prevent return flow from the parking brake pressure outlet to the pressure source inlet.

The service brake supply circuit is configured to supply the hydraulic pressure from the pressure source flowpath to first and second service brake outlets, and to prevent return flow from the first and second service brake outlets to the pressure source inlet.

The parking brake pressure outlet opens through the interface surface of the second valve block in fluid communication with the parking brake pressure inlet of the first valve module in the connected configuration.

The first service brake outlet opens through the at least one further external surface of the second valve block to supply the hydraulic pressure to a first service brake circuit of the vehicle when the first service brake circuit is connected to the first service brake outlet.

The second service brake outlet opens through the interface surface of the second valve block in fluid communication with the extension inlet of the first valve module, to supply the hydraulic pressure via the extension flowpath to a second service brake circuit of the vehicle when the second service brake circuit is connected to the extension outlet in the connected configuration.

The internal flowpaths of the valve block of the first valve module may be formed by machining, and the internal flowpaths of the second valve block by casting.

In a second aspect, the present disclosure provides a method for supplying hydraulic pressure to multiple hydraulic circuits of a vehicle, including forming a monolithic, first valve block including an external interface surface, at least one further external surface, and a plurality of internal flowpaths, and assembling together a plurality of first valves with the first valve block to form a first valve module.

The first valves are arranged in fluid communication with respective ones of the internal flowpaths of the first valve block to define at least a first functional circuit for controlling a flow of hydraulic fluid from a first inlet of the first valve block to a first outlet of the first valve block. The first inlet of the first valve block opens through the interface surface of the first valve block, while the first outlet of the first valve block opens through the at least one further external surface of the first valve block.

A further respective one of the internal flowpaths of the first valve block forms an extension flowpath opening through an extension inlet in the interface surface of the first valve block and an extension outlet in the at least one further external surface of the first valve block, wherein the extension inlet is in uninterrupted fluid communication with the extension outlet via the extension flowpath.

The method further includes forming a monolithic, second valve block including an external interface surface, at least one further external surface, and a plurality of internal flowpaths, and assembling together a plurality of second valves with the second valve block to form a second valve module.

The second valves are arranged in fluid communication with respective ones of the internal flowpaths of the second valve block to define at least one, second functional circuit for controlling a flow of hydraulic fluid from a second inlet of the second valve block to second, third and fourth outlets of the second valve block.

The second inlet and the second outlet of the second valve block open through the at least one further external surface of the second valve block, while the third and fourth outlets of the second valve block open through the interface surface of the second valve block.

The method further includes sealingly connecting together the interface surfaces of the first and second valve blocks to place the third and fourth outlets of the second valve block in fluid communication, respectively with the first inlet and the extension inlet of the first valve block.

The internal flowpaths of the second valve block are formed by casting, and the internal flowpaths of the first valve block by machining.

BRIEF DESCRIPTION OF THE DRAWINGS

Further features and advantages will be apparent from the following illustrative embodiment which will now be described, purely by way of example and without limitation to the scope of the claims, and with reference to the accompanying drawings, in which:

FIGS. 1 and 2 are respectively a side view and a schematic plan view of a vehicle;

FIG. 3 shows various functional elements of the vehicle including a valve assembly comprising first and second valve modules 4000, 1000 shown in outline;

Reference numerals and characters appearing in more than one of the figures indicate the same or corresponding elements in each of them.

DETAILED DESCRIPTION

Figure 4:
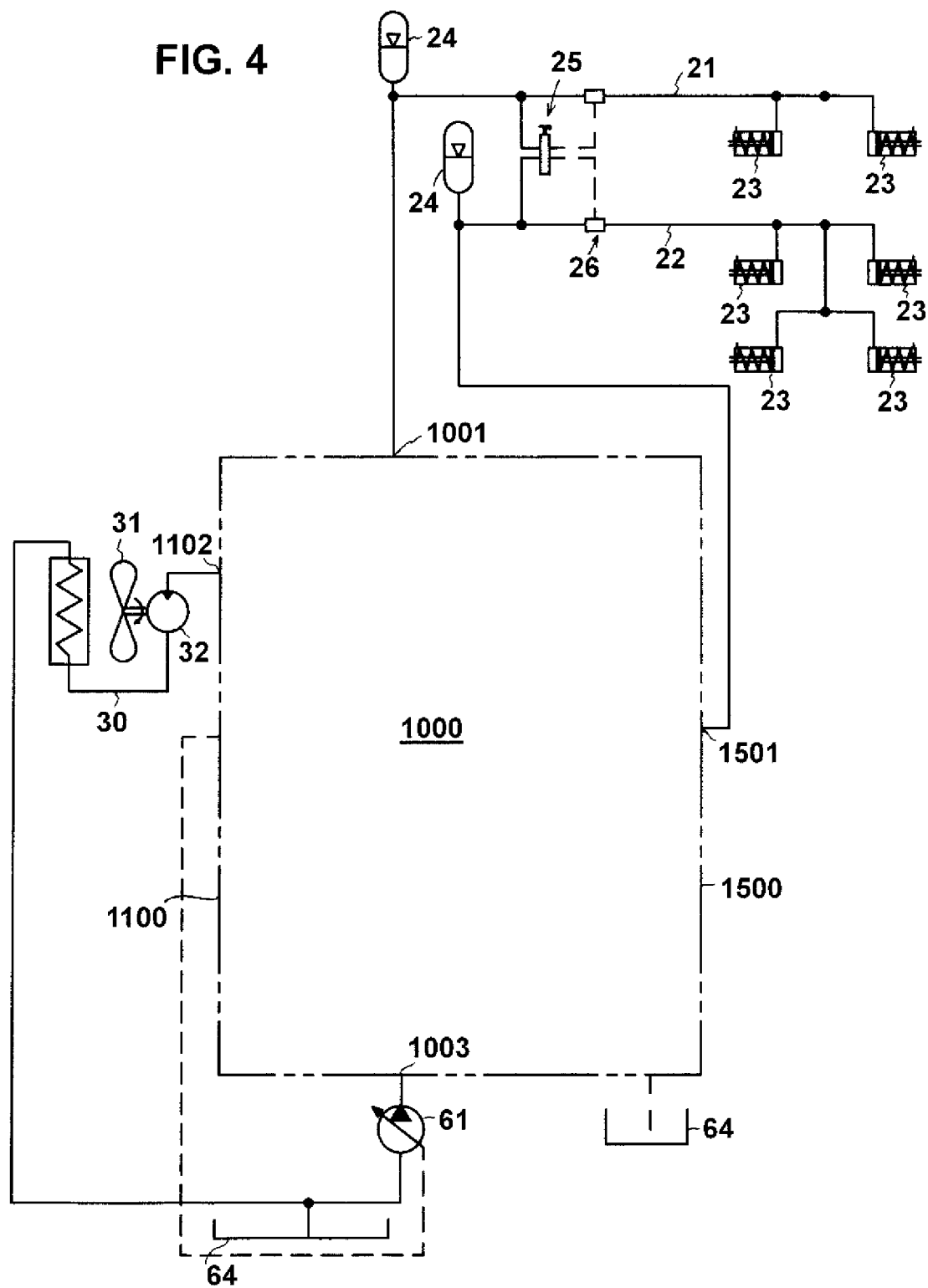
FIG. 4 shows the second valve module 1000 installed on its own without the first valve module 4000.

Referring to FIGS. 1-3, a vehicle 10 may be configured for example as an articulated truck having wheels 20, a cooling fan 31 driven by a hydraulic motor 32 for cooling the engine 11, a tipping body 41 operable by a hydraulic ram or rams 42, and steering actuators 51 for steering the tractor unit including the front wheels. A hydraulic pump or pumps 61 may be arranged to supply hydraulic pressure from a tank 64 of hydraulic fluid to multiple hydraulic circuits, which may include first and second service brake circuits 21, 22, a parking brake actuation circuit 70, a differential lock actuation circuit 80, and a cooling fan circuit 30.

In this specification, unless the context suggests otherwise, hydraulic pressure is understood to refer to pressure or both pressure and flow of hydraulic fluid, depending on the application—for example, pressure with little or no flow may be used as a signal to control hydraulic valves, while both pressure and substantial flow may be required to operate hydraulic equipment of the vehicle.

Each service brake circuit 21, 22 may include a hydraulic accumulator 24 and service brake actuators 23 for braking the wheels 20 responsive to user commands via a brake pedal 25 or automatic control via an automatic retarding system 26. The first service brake circuit 21 may act on the two front wheels of the tractor unit while the second service brake circuit 22 acts on the four rear wheels of the trailer unit.

The parking brake circuit 70 may include a hydraulic accumulator 72 and one or more parking brake actuators 71 for applying the parking brakes to brake the wheels 20 responsive to an electrical parking brake actuation signal S5 generated by a user command via a parking brake control (not shown).

The differential lock circuit 80 may includes a differential lock control (not shown) and one or more differential lock actuators 81 for selectively locking the differential at one or more points in the vehicle transmission, responsive to a user command to the differential lock control.

Referring to FIG. 3, a first hydraulic valve module 4000 is arranged to supply hydraulic pressure to the parking brake actuation circuit 70 and the differential lock actuation circuit 80, and includes a monolithic, first valve block 4099 defining a plurality of internal flowpaths 4012, an external, first interface surface 4600, and at least one further external surface 4700 which as shown may be formed on one or more external sides of the valve block. The first interface surface 4600 may be substantially flat.

The first interface surface 4600 is sealing connectable to a corresponding external second interface surface 1500 of another, second valve module 1000. For this purpose the first valve block 4099 may include a connection element 4098 for connecting the valve blocks together with the interface surfaces 4600, 1500 sealingly engaged together. The connection element could comprise for example one or more fixings or fixing receiving portions such as connection holes or connection flanges for receiving screws or other connectors that connect together the first and second valve modules 4000, 1000 with their respective first and second interface surfaces 4600, 1500 sealingly engaged together in a connected configuration, as shown in FIG. 3.

The internal flowpaths 4012 of the first module 4000 open through a plurality of first ports 4601, 4602, 4603, 4604 in the first interface surface 4600, while a plurality of internal flowpaths 1012 of the second module 1000 open through a plurality of second ports 1501, 1502, 1503, 1504 in the second interface surface 1500, as further described below. The first and second modules 4000, 1000 may be separable at the first and second interface surfaces 4600, 1500, and connectable together at the first and second interface surfaces 4600, 1500 in a connected configuration in which each of the first ports 4601, 4602, 4603, 4604 is in fluid communication with a respective one of the second ports 1501, 1502, 1503, 1504 to connect together the internal flowpaths of the two modules, as further explained below.

The first and second modules 4000, 1000 may be installed together in the connected configuration in a vehicle, for example, the vehicle 10 as illustrated.

In the connected configuration, the second module 1000 may receive hydraulic pressure from the pump 61 and supply the hydraulic pressure, e.g. via a fan supply valve assembly 1023, 1024, to the fan circuit 30 to drive the cooling fan 31 and, via a service brake supply circuit 1027 of the second module 1000, to the first and second service brake circuits 21, 22. The second module 1000 may further supply the hydraulic pressure from the pump 61 to the first module 4000, which in turn supplies the hydraulic pressure to the parking brake actuation circuit 70 and the differential lock actuation circuit 80, as further described below.

Referring to FIG. 4, the second module 1000 may be installed on its own in a vehicle that requires a supply to its service brake and fan circuits but does not require a supply to parking brake or differential lock actuation circuits. In this configuration it will be noted that the second service brake circuit 22 is supplied from a second service brake outlet 1501 which opens through the interface surface 1500 of the second valve block 1000.

In contrast, referring again to FIG. 3, it can be seen that when the first and second modules 4000, 1000 are installed together in the connected configuration, the second service brake circuit 22 is supplied from an extension outlet 4001 in the at least one further external surface 4700 of the first module 4000. Thus, although the second service brake circuit 22 is supplied with hydraulic pressure from the service brake supply circuit 1027 of the second module in both the FIG. 3 and FIG. 4 configurations, the connection port is extended from port 1501 in the FIG. 4 configuration to port 4001 in the FIG. 3 configuration. This provides a different connection layout which, in embodiments, may be customised to the requirements of the particular vehicle by forming the internal flowpaths of the first valve block 4000 by machining, as further discussed below.

Figure 5:
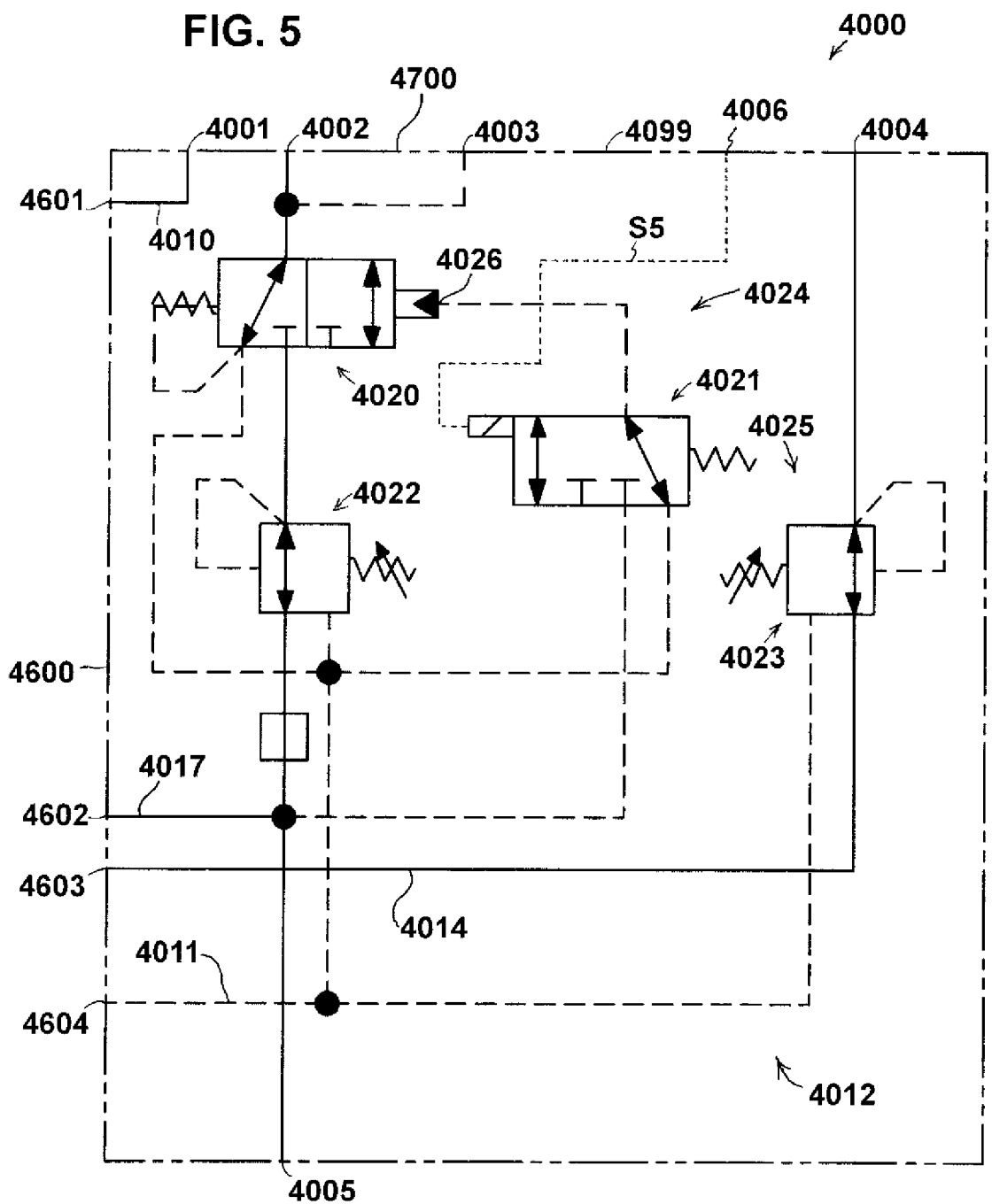
FIG. 5 shows the first valve module 4000.

Referring now to FIG. 5, in addition to the first valve block 4099, the first module 4000 further includes a plurality of hydraulic valves, and an electrical connector 4006 for receiving the electrical parking brake actuation signal S5. The valves are arranged in fluid communication with respective ones of the internal flowpaths 4012 to define a parking brake control circuit 4024, and a differential lock supply circuit 4025.

The parking brake control circuit 4024 is configured to control the supply of hydraulic pressure to the parking brake actuation circuit 70 of the vehicle, and includes a parking brake pressure inlet 4602, a parking brake accumulator inlet 4005, a parking brake control outlet 4002, a drain flowpath 4011, a parking brake control valve 4020, a parking brake pressure reducing valve 4022, and a solenoid actuated parking brake pilot valve 4021.

The parking brake pressure inlet 4602 opens through the first interface surface 4600 to receive a supply of hydraulic pressure. The hydraulic pressure can be supplied from the hydraulic pump or pumps 61 when connected to the parking brake pressure inlet 4602.

The parking brake accumulator inlet 4005 is arranged in uninterrupted fluid communication with the parking brake pressure inlet 4602 and opens through the at least one further external surface 4700 for connecting a hydraulic accumulator 72 to the supply of hydraulic pressure from the parking brake pressure inlet 4602.

The parking brake control outlet 4002 opens through the at least one further external surface 4700 to supply the hydraulic pressure from the parking brake pressure inlet 4602 via a parking brake pressure supply flowpath 4017 of the first module 4000 to the parking brake actuation circuit 70 of the vehicle.

The drain flowpath 4011 opens through a drain outlet 4604 in the first interface surface 4600 to relieve the hydraulic pressure from the parking brake pressure inlet 4602 to tank 64, when a tank 64 is connected in fluid communication with the drain outlet 4604, e.g. via a tank flowpath 1015 of the first module.

The parking brake control valve 4020 is operable to connect the parking brake control outlet 4002, selectively to the hydraulic pressure from the parking brake pressure inlet 4602, and to the drain flowpath 4011, so as to selectively pressurise and depressurise the parking brake actuation circuit 70.

The parking brake pressure reducing valve 4022 is configured to reduce the hydraulic pressure from the parking brake pressure inlet 4602 supplied via the parking brake control valve 4020 to the parking brake control outlet 4002.

The solenoid actuated parking brake pilot valve 4021 is operable to connect an actuator inlet 4026 of the parking brake control valve 4020, selectively to the hydraulic pressure from the parking brake pressure inlet 4602, and to the drain flowpath 4011, responsive to an electrical parking brake actuation signal S5 received via the electrical connector 4006 from a user control (not shown) of the vehicle 10.

Sensor port 4003 opens through the at least one further external surface 4700 and may be used for connection of a pressure sensor.

The differential lock supply circuit 4025 includes a differential lock pressure inlet 4603, a differential lock supply outlet 4004, and a differential lock pressure reducing valve 4023.

The differential lock pressure inlet 4603 opens through the interface surface 4600 to receive a supply of hydraulic pressure, e.g. from a differential lock pressure outlet 1503 of the second module as further described below.

The differential lock supply outlet 4004 opens through the at least one further external surface 4700 to supply the hydraulic pressure from the differential lock pressure inlet 4603 via a differential lock pressure supply flowpath 4014 of the first valve module 4000 to the differential lock actuation circuit 80 of the vehicle which is connected in use to the differential lock pressure inlet 4603.

The differential lock pressure reducing valve 4023 is configured to reduce the hydraulic pressure supplied from the differential lock pressure inlet 4603 to the differential lock supply outlet 4004. The differential lock pressure reducing valve 4023 may be arranged in fluid communication with the drain flowpath (4011), as shown.

In order to reconfigure the layout of the hydraulic connection points when both of the first and second modules 4000, 1000 are installed together in the connected configuration, as mentioned above, the internal flowpaths 4012 of the first module further include an extension flowpath 4010.

The extension flowpath 4010 opens through an extension inlet 4601 in the interface surface 4600 and an extension outlet 4001 in the at least one further external surface 4700. The extension inlet 4601 is in uninterrupted fluid communication with the extension outlet 4001 via the extension flowpath 4010—which is to say, the extension flowpath 4010 does not include any valves or other components to prevent the free flow of hydraulic fluid in any direction through the extension flowpath 4010 between the extension inlet 4601 and the extension outlet 4001.

Thus, the function of the second module 1000 in supplying hydraulic pressure to the first and second service brake circuits, which may include protecting the circuits via a brake circuit protection valve as further described below, is unchanged when the two modules are installed together in the connected configuration to reconfigure the position of the connection to the second service brake circuit.

In order to customise the extension outlet 4001 and other external port positions of the first module 4000 to suit different vehicles, the internal flowpaths 4012 of the valve block 4099 including the extension flowpath 4010 may be formed by machining, e.g. from solid bar stock, and not by casting. Forming the internal flowpaths and connection ports by machining makes it possible to adapt the port locations to the requirements of different vehicles.

Figure 6:
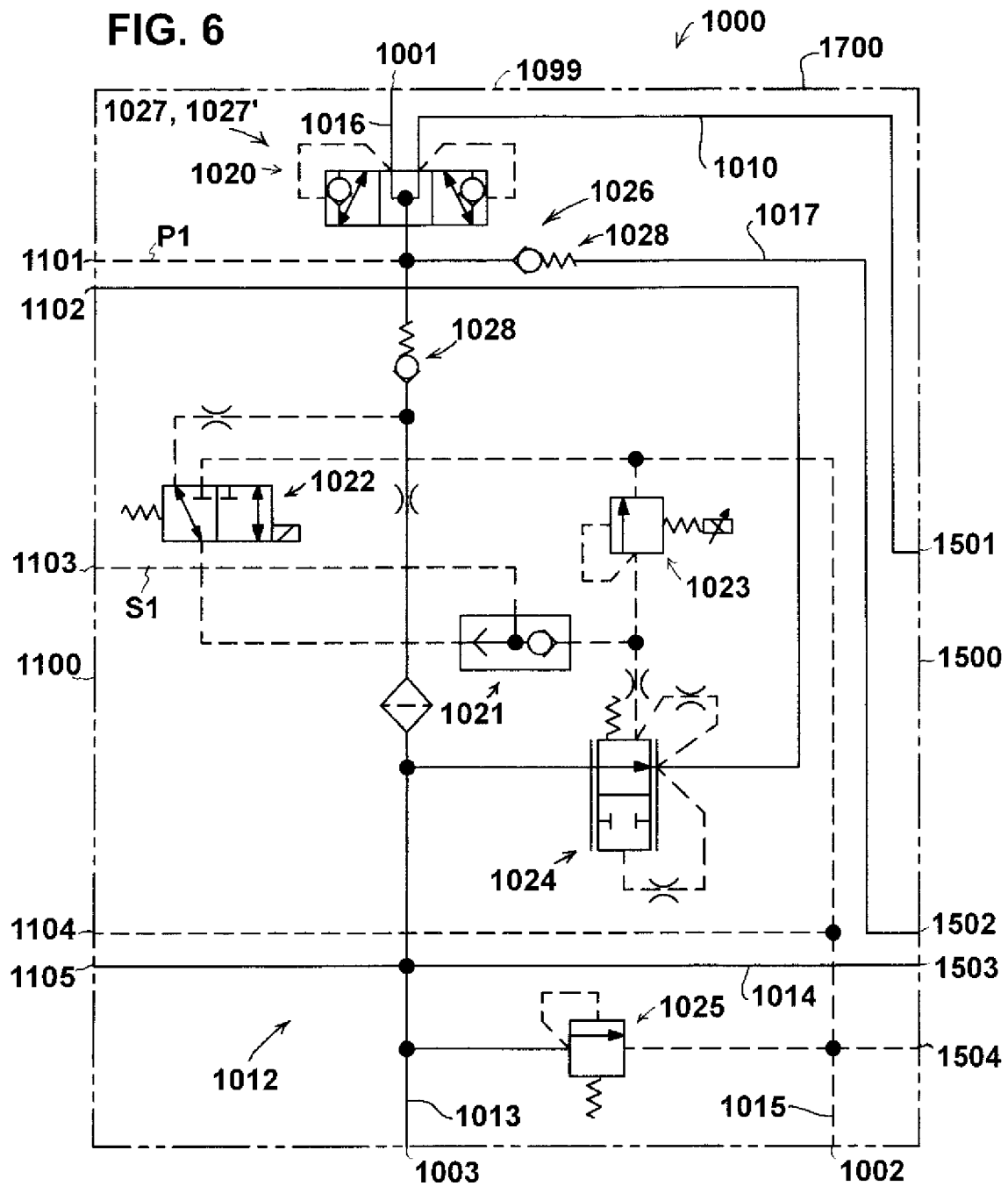
FIG. 6 shows the second valve module 1000.

Referring now to FIG. 6, the second hydraulic valve module 1000 includes a monolithic, second valve block 1099 which defines a plurality of internal flowpaths 1012, the external, second interface surface 1500, and at least one further external surface 1700 which may be formed on one or more sides of the second module 1000.

As described above, the first and second valve modules 4000, 1000 are connectable together in a connected configuration in which the respective interface surfaces 4600, 1500 are sealingly engaged together.

The internal flowpaths 1012 of the second hydraulic valve module 1000 include a pressure source flowpath 1013, a differential lock pressure supply flowpath 1014, a tank flowpath 1015, and a parking brake pressure supply flowpath 1017.

The pressure source flowpath 1013 opens through a pressure source inlet 1003 in the at least one further external surface 1700 of the second valve block 1099 to receive a supply of hydraulic pressure, e.g. from a hydraulic pump or pumps 61 of the vehicle 10 when connected to the pressure source inlet 1003.

The differential lock pressure supply flowpath 1014 of the second valve module 1000 is arranged in fluid communication with the pressure source flowpath 1013 and opens through a differential lock pressure outlet 1503 arranged in the interface surface 1500 of the second valve block 1099 to fluidly communicate with the differential lock pressure inlet 4603 of the first hydraulic valve module 4000 in the connected configuration.

The tank flowpath 1015 opens through a tank outlet 1002 in the at least one further external surface 1700 of the second valve block 1099 and through a tank inlet 1504 in the interface surface 1500 of the second valve block 1099. The tank inlet 1504 is arranged to fluidly communicate with the drain outlet 4604 of the first hydraulic valve module 4000 in the connected configuration to relieve hydraulic pressure to tank 64 when a tank 64 is connected to the tank outlet 1002. The terms "tank inlet" and "tank outlet" are used indicate an inlet and outlet, respectively, of a flowpath to tank.

The second hydraulic valve module 1000 includes a plurality of valves which are arranged in fluid communication with respective ones of the internal flowpaths 1012 to define a parking brake supply circuit 1026, and a service brake supply circuit 1027, and optionally also a fan supply valve assembly for supplying hydraulic pressure to the fan circuit 30.

The parking brake supply circuit 1026 includes check valves 1028 and is configured to supply the hydraulic pressure from the pressure source flowpath 1013 via the parking brake pressure supply flowpath 1017 of the second module 1000 to a parking brake pressure outlet 1502, and to prevent return flow from the parking brake pressure outlet 1502 to the pressure source inlet 1003.

The service brake supply circuit 1027 is configured to supply the hydraulic pressure from the pressure source flowpath 1013 via a first brake circuit flowpath 1016 to a first service brake outlet 1001, and via a second brake circuit flowpath 1010 to a second service brake outlet 1501, and to prevent return flow from the first and second service brake outlets 1001, 1501 to the pressure source inlet 1003.

The parking brake pressure outlet 1502 opens through the interface surface 1500 of the second valve block 1000 in fluid communication with the parking brake pressure inlet 4602 of the first valve module 4000 in the connected configuration.

The first service brake outlet 1001 opens through the at least one further external surface 1700 of the second valve block 1000 to supply the hydraulic pressure to the first service brake circuit 21 of the vehicle 10 when the first service brake circuit 21 is connected to the first service brake outlet 1001.

The second service brake outlet 1501 opens through the interface surface 1500 of the second valve block 1099 in fluid communication with the extension inlet 4601 of the first valve module 4000, to supply the hydraulic pressure via the extension flowpath 4010 to a second service brake circuit 22 of the vehicle 10 when the second service brake circuit 22 is connected to the extension outlet 4001 in the connected configuration.

Optionally, the internal flowpaths 4012 of the first valve block 4099 may be formed by machining, for example, from bar stock to suit the connection layout of the particular vehicle 10, while the internal flowpaths 1012 of the second valve block 1099 may be formed by casting to define a more complex internal flowpath configuration for optimal hydraulic efficiency.

The valves of the or each valve module 4000, 1000 may be mounted in recesses formed in the respective valve block, and/or in housings mounted on the respective valve block, and fluidly connected together by the internal flowpaths. Flowpaths are indicated generally in the drawings by solid lines for main pressure supply flowpaths, and broken lines for pressure signal flowpaths or return flowpaths to tank.

The second module 1000 may include a third interface surface 1100, wherein respective ones of the internal flowpaths 1012 of the second module 1000 open through a plurality of third ports 1101, 1102, 1103, 1104, 1105 formed in the third interface surface 1100. The third interface surface 1100 is configured to be sealingly connectable with a corresponding interface surface 2200 of a further, third hydraulic valve module 2000 so that the third ports communicate with flowpaths of the third valve module via corresponding ports formed in the further surface to form a larger valve assembly.

The third module 2000 (shown only in outline, FIG. 3) may be configured to receive hydraulic pressure from port 1105 of the second module and to supply the hydraulic pressure to operate the hydraulic ram or rams 42 for tipping the vehicle body 41. The third module 2000 may also receive a separate supply of hydraulic pressure from another pump or pumps (not shown) for operating the steering actuators 51 of the vehicle.

The second module 1000 may be configured to output a first load sensing pressure signal Si indicative of variations in load on the fan circuit 30 and the first and second service brake circuits 21, 22. Port 1103 may convey the first load sensing pressure signal Si via a corresponding port of the third module to a priority valve of the third module which is operable responsive to the first load sensing pressure signal Si to restrict the supply of hydraulic pressure from the pump 61 to the ram or rams 42 so as to maintain the supply of hydraulic pressure from the pump 61 to the first and second service brake outlets 1001, 1501 and the fan circuit 30.

The second module 1000 may include a pressure relief valve 1025 configured to relieve excess pressure supplied from the pump 61 to the first and second service brake outlets 1001, 1501.

The second module 1000 may include a service brake supply valve assembly 1027' configured to control the supply of pressure from the pressure source inlet 1003 to each of the first and second service brake outlets 1001, 1501, and a fan supply valve assembly 1023, 1024 configured to control a supply of hydraulic pressure from the pressure source inlet 1003 via a fan supply outlet 1102 opening through the third interface surface 1100 to the fan circuit 30 to drive the cooling fan 31. If the third module 2000 is present, then the pressure is routed from the fan supply outlet 1102 to the fan circuit 30 via a corresponding inlet port and flowpath formed in the third module.

The service brake supply valve assembly 1027' may include a brake circuit protection valve 1020 which receives a flow of hydraulic fluid via a check valve 1028 from the pressure source inlet 1003 and supplies it to both of the first and second service brake outlets 1001, 1501. The brake circuit protection valve 1020 may be operable by pressure signals from the first and second service brake circuits 21, 22, responsive to sensing that one of said circuits 21, 22 is at a higher pressure than the other, to selectively prevent a return flow of hydraulic fluid from the respective service brake circuit which is at a higher pressure.

The second module 1000 may include a shuttle valve 1021 which combines or resolves pressure signals from the fan circuit 30 and from the supply from the pump 61 to the first and second service brake circuits 21, 22 to generate the first load sensing pressure signal S1.

In addition to shuttle valve 1021, the second module 1000 may further include a solenoid actuated valve 1022 arranged to modulate the pressure signal from the supply from the pump 61 to the first and second service brake circuits 21, 22 responsive to an electrical signal (not shown) generated based on sensor output from sensors (not shown) that monitor pressure in the first and second service brake circuits 21, 22. In this way valve 1022 may modulate the first load sensing pressure signal S1 to reflect demand from the first and second service brake circuits 21, 22.

Where the second module 1000 includes a fan supply valve assembly, the fan supply valve assembly may include valves 1023 and 1024.

Valve 1023 is solenoid actuated and arranged to modulate the pressure signal from the fan circuit 30 responsive to an electrical signal generated based on sensor output from one or more sensors (not shown) that monitor a temperature of the hydraulic fluid and/or engine coolant.

Valve 1024 is arranged to modulate the supply of hydraulic pressure to the fan supply outlet 1102 so as to increase or decrease the speed of the cooling fan 31 responsive to the pressure signal which is received from the fan circuit 30 and modulated by the solenoid actuated valve 1023. In this way valves 1023 and 1024 together may modulate the first load sensing pressure signal S1 to reflect demand from the fan circuit 30.

The second module 1000 may be configured to supply hydraulic fluid from the pump 61 via the pressure source inlet 1003 at equal pressure to the first and second service brake outlets 1001, 1501 and to a pilot pressure supply port 1101 in the third interface surface 1100, which supplies pilot pressure P1 to actuate valves in the third module 2000.

The tank flowpath 1015 may communicate with a tank inlet port 1104 in the third interface surface 1100 to receive a flow to tank from the third module 2000.

Figure 7:
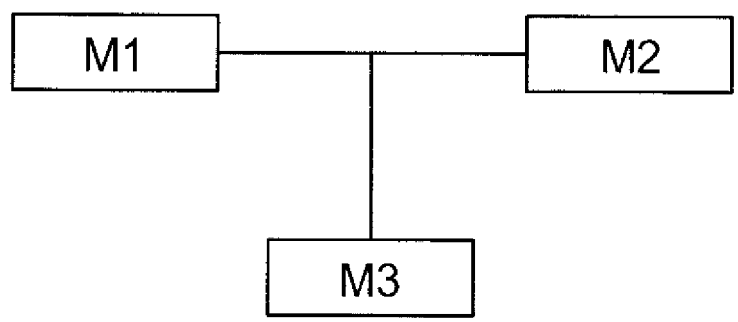
FIG. 7 illustrates an embodiment of the novel method in three steps.

Referring now to FIG. 7, an embodiment of the novel method for supplying hydraulic pressure to multiple hydraulic circuits 21, 22, 70 of a vehicle 10 is illustrated in three method steps M1, M2, M3 with reference to the embodiment of FIGS. 1-6.

Method step M1 includes forming a monolithic, first valve block 4099 including an external interface surface 4600, at least one further external surface 4700, and a plurality of internal flowpaths 4012, and assembling together with the first valve block 4099 a plurality of first valves, exemplified by the parking brake control valve 4020, parking brake pilot valve 4021, and parking brake pressure reducing valve 4022, to form a first valve module 4000.

The first valves 4020, 4021, 4022 are arranged in fluid communication with respective ones of the internal flowpaths 4012 of the first valve block 4099 to define at least a first functional circuit, which is to say, at least a first circuit that controls a flow of hydraulic fluid. The first circuit is exemplified by the parking brake control circuit 4024, and in use, controls a flow of hydraulic fluid from a first inlet 4602 of the first valve block 4099 to a first outlet 4002 of the first valve block 4099.

The first inlet, exemplified by the parking brake pressure inlet 4602 of the first valve block 4099 opens through the interface surface 4600 of the first valve block 4099.

The first outlet, exemplified by the parking brake control outlet 4002 of the first valve block 4099 opens through the at least one further external surface 4700 of the first valve block 4099.

A further respective one of the internal flowpaths 4012 of the first valve block 4099 forms an extension flowpath 4010, which opens through an extension inlet 4601 in the first interface surface 4600 of the first valve block 4099 and an extension outlet 4001 in the at least one further external surface 4700 of the first valve block 4099. The extension inlet 4601 is in uninterrupted fluid communication with the extension outlet 4001 via the extension flowpath 4010, which is to say, the extension flowpath 4010 does not include any valves or other components to prevent the free flow of hydraulic fluid in any direction through the extension flowpath 4010 between the extension inlet 4601 and the extension outlet 4001.

Method step M2 includes forming a monolithic, second valve block 1099 including an external interface surface 1500, at least one further external surface 1700, and a plurality of internal flowpaths 1012, and assembling together with the second valve block 1099 a plurality of second valves, exemplified by the brake circuit protection valve 1020 and check valves 1028, to form a second valve module 1000.

The second valves 1020, 1028 are arranged in fluid communication with respective ones of the internal flowpaths 1012 of the second valve block 1099 to define at least one, second functional circuit, which is to say, at least one second circuit that controls a flow of hydraulic fluid. The at least one second functional circuit is exemplified by the parking brake supply circuit 1026 and the service brake supply circuit 1027, and controls a flow of hydraulic fluid from a second inlet 1003 of the second valve block 1099 to second 1001, third 1502 and fourth 1501 outlets of the second valve block 1099. In the illustrated embodiment, the second inlet is exemplified by pressure source inlet 1003, and the second, third and fourth outlets are exemplified, respectively by the first service brake outlet 1001, the parking brake pressure outlet 1502, and the second service brake outlet 1501.

The second inlet or pressure source inlet 1003 and the second outlet or first service brake outlet 1001 of the second valve block 1099 open through the at least one further external surface 1700 of the second valve block 1099.

The third outlet or parking brake pressure outlet 1502 and the fourth outlet or second service brake outlet 1501 open through the interface surface 1500 of the second valve block 1099.

Method step M3 follows method steps M1 and M2 and includes sealingly connecting together the interface surfaces 4600, 1500 of the first and second valve blocks 4099, 1099 to place the third outlet or parking brake pressure outlet 1502 and the fourth outlet or second service brake outlet 1501 in fluid communication, respectively with the first inlet or parking brake pressure inlet 4602 and the extension inlet 4601 of the first valve block 4099.

In method steps M1 and M2, the internal flowpaths 1012 of the second valve block 1099 are formed by casting, and the internal flowpaths 4012 of the first valve block 4099 are formed by machining.

In summary, embodiments provide a first hydraulic valve module 4000 including a first monolithic valve block 4099 with internal flowpaths and valves defining circuits for controlling hydraulic pressure supplied to parking brake and differential lock actuation circuits 70, 80 of a vehicle 10. The internal flowpaths include an extension flowpath 4010 which provides uninterrupted fluid communication between an extension inlet 4601 and outlet 4001 opening respectively through an interface surface 4600 and further external surface 4700 of the first valve block. A second hydraulic valve module 1000 may be provided, including a second monolithic valve block 1099 having a second interface surface 1500, internal flowpaths and valves defining circuits for supplying hydraulic pressure via first and second service brake outlets 1001, 1501 to first and second service brake circuits 21, 22 and, via respective ports communicating at the conjoined interface surfaces 4600, 1500 in a connected configuration of the first and second modules, to the circuits of the first module 1000. The second service brake outlet 1501 communicates with the extension inlet 4601 in the connected configuration. The internal flowpaths of the first and second modules may be formed respectively by machining and by casting. In a related method, first and second valve blocks 4099, 1099 with internal flowpaths formed respectively by machining and by casting are assembled together with valves to define valve modules 4000, 1000 having respective, first and second functional circuits. The first valve block 4099 includes an extension flowpath 4010. The second module supplies hydraulic pressure to both the first functional circuit and the extension flowpath of the first module.

INDUSTRIAL APPLICABILITY

The extension flowpath 4010 formed in the first valve block 4099 makes it possible to arrange the hydraulic connection to one of the hydraulic circuits of the vehicle, e.g. the second service brake circuit 22, as an outlet port 1501 opening through the interface surface 1500 of the second valve module 1000. This allows room for convenient connection of the hydraulic coupling when the second module is used on its own so that the interface surface 1500 is exposed, and adapts the position of the connection when the two modules are used together.

When the second module 1000 is connected to the first module 4000 to supply one or more additional circuits such as parking brake and differential lock actuation circuits, the extension flowpath 4010 extends the flowpath to the respective hydraulic circuit, e.g. the second service brake circuit 22, to the extension outlet 4001 opening through the at least one further external surface 4700 of the first valve block 4099. In this way the second valve module 1000 carries out the same function in supplying hydraulic pressure to the respective circuit, e.g. to protect the split brake circuits 21, 22 by means of a brake circuit protection valve 1020, irrespective of whether it is used on its own or in the connected configuration with the first module 4000.

Forming the internal flowpaths of the second valve block by casting may permit a relatively more intricate configuration than can be achieved with machining and so can result in better hydraulic efficiency and so better performance of the valves which are in fluid communication via the flowpaths. At the same time, by machining the internal flowpaths of the first valve block, including the extension flowpath 4010, it is possible to adapt the hydraulic connection layout to the particular requirements of the vehicle in which the valve assembly will be installed. Thus, the hydraulic efficiency of a cast valve block may be combined with the adaptability of a machined valve block.

Many further adaptations are possible within the scope of the claims.

In the claims, reference numerals and characters are provided in parentheses, purely for ease of reference, and are not to be construed as limiting features.

LIST OF ELEMENTS 10 vehicle
11 engine
20 wheels
21 first service brake circuit
22 second service brake circuit
23 service brake actuators
24 hydraulic accumulator
25 brake pedal
26 automatic retarding system
30 cooling fan circuit
31 cooling fan
32 hydraulic motor
41 tipping body
42 hydraulic ram or rams
51 steering actuators
61 hydraulic pump or pumps
64 tank
70 parking brake actuation circuit
71 parking brake actuators
72 hydraulic accumulator
80 differential lock actuation circuit
81 differential lock actuators
1000 second valve module
1001 first service brake outlet; second outlet
1002 tank outlet
1003 pressure source inlet; second inlet
1010 second brake circuit flowpath
1012 internal flowpaths
1013 pressure source flowpath
1014 differential lock pressure supply flowpath
1015 tank flowpath
1016 first brake circuit flowpath
1017 parking brake pressure supply flowpath
1020, 1028 second valves
1020 brake circuit protection valve
1021 shuttle valve
1022 solenoid actuated valve
1023, 1024 fan supply valve assembly
1025 pressure relief valve
1026, 1027 second functional circuit
1026 parking brake supply circuit
1027 service brake supply circuit
1027' service brake supply valve assembly
1028 check valves
1099 second valve block
1100 third interface surface
1101, 1102, 1103, 1104, 1105 third ports
1101 pilot pressure supply port
1102 fan supply outlet
1104 tank inlet port
1500 second interface surface
1501, 1502, 1503, 1504 second ports
1501 second service brake outlet; fourth outlet
1502 parking brake pressure outlet; third outlet
1503 differential lock pressure outlet
1504 tank inlet
1700 further external surface
2000 third hydraulic valve module
2200 interface surface
4000 first hydraulic valve module
4001 extension outlet
4002 parking brake control outlet; first outlet
4003 sensor port
4004 differential lock supply outlet
4005 parking brake accumulator inlet
4006 electrical connector
4010 extension flowpath
4011 drain flowpath
4012 internal flowpaths
4014 differential lock pressure supply flowpath
4017 parking brake pressure supply flowpath
4020, 4021, 4022 first valves
4020 parking brake control valve
4021 solenoid actuated parking brake pilot valve
4022 parking brake pressure reducing valve
4023 differential lock pressure reducing valve
4024 parking brake control circuit; first functional circuit
4025 differential lock supply circuit
4026 actuator inlet
4098 connection element
4099 first valve block
4600 first interface surface
4601, 4602, 4603, 4604 first ports
4601 extension inlet
4602 parking brake pressure inlet; first inlet
4603 differential lock pressure inlet
4604 drain outlet
4700 further external surface
M1, M2, M3 method steps
P1 pilot pressure
S1 first load sensing pressure signal
S5 electrical parking brake actuation signal

What is claimed is:

1. A hydraulic valve module (4000) for use in supplying hydraulic pressure to a parking brake actuation circuit (70) and a differential lock actuation circuit (80) in a vehicle (10), the module including:
a plurality of valves,
an electrical connector (4006) for receiving a parking brake actuation signal (S5), and
a monolithic valve block (4099), the valve block (4099) having:
a plurality of internal flowpaths (4012),
an external interface surface (4600), and
at least one further external surface (4700);
the valves being arranged in fluid communication with respective ones of the internal flowpaths (4012) to define:
a parking brake control circuit (4024), and
a differential lock supply circuit (4025);
the parking brake control circuit (4024) including:
a parking brake pressure inlet (4602), opening through the interface surface (4600) for receiving a supply of hydraulic pressure;
a parking brake accumulator inlet (4005) in uninterrupted fluid communication with the parking brake pressure inlet (4602) and opening through the at least one further external surface (4700) for connecting a hydraulic accumulator (72) to the supply of hydraulic pressure from the parking brake pressure inlet (4602);
a parking brake control outlet (4002), opening through the at least one further external surface (4700) for supplying the hydraulic pressure from the parking brake pressure inlet (4602) to the parking brake actuation circuit (70) of the vehicle;
a drain flowpath (4011), opening through a drain outlet (4604) in the interface surface (4600) to relieve the hydraulic pressure from the parking brake pressure inlet (4602) to tank (64);
a parking brake control valve (4020) operable to connect the parking brake control outlet (4002), selectively to the hydraulic pressure from the parking brake pressure inlet (4602), and to the drain flowpath (4011);
a parking brake pressure reducing valve (4022) configured to reduce the hydraulic pressure from the parking brake pressure inlet (4602) supplied via the parking brake control valve (4020) to the parking brake control outlet (4002); and
a solenoid actuated parking brake pilot valve (4021) operable to connect an actuator inlet (4026) of the parking brake control valve (4020), selectively to the hydraulic pressure from the parking brake pressure inlet (4602), and to the drain flowpath (4011), responsive to an electrical parking brake actuation signal (S5) received via the electrical connector (4006);
the differential lock supply circuit (4025) including:
a differential lock pressure inlet (4603), opening through the interface surface (4600) for receiving a supply of hydraulic pressure;
a differential lock supply outlet (4004), opening through the at least one further external surface (4700) for supplying the hydraulic pressure from the differential lock pressure inlet (4603) to the differential lock actuation circuit (80) of the vehicle; and
a differential lock pressure reducing valve (4023) configured to reduce the hydraulic pressure supplied from the differential lock pressure inlet (4603) to the differential lock supply outlet (4004);
the interface surface (4600) being sealingly connectable to a corresponding surface (1500) of another valve module (1000);
said internal flowpaths (4012) further including an extension flowpath (4010), the extension flowpath (4010) opening through an extension inlet (4601) in the interface surface (4600) and an extension outlet (4001) in the at least one further external surface (4700), wherein the extension inlet (4601) is in uninterrupted fluid communication with the extension outlet (4001) via the extension flowpath (4010).

2. A hydraulic valve module (4000) according to claim 1, wherein the internal flowpaths (4012) of the valve block (4099) are formed by machining.

3. A hydraulic valve module (4000) according to claim 1, wherein the differential lock pressure reducing valve (4023) is arranged in fluid communication with the drain flowpath (4011).

4. A hydraulic valve apparatus including:
a first hydraulic valve module (4000) according to claim 1, and
a second hydraulic valve module (1000);
the second hydraulic valve module (1000) including:
a plurality of valves, and
a monolithic second valve block (1099), the second valve block (1099) having:
a plurality of internal flowpaths (1012),
an external, second interface surface (1500), and
at least one further external surface (1700);
the first and second valve modules (4000, 1000) being connectable together in a connected configuration in which the respective interface surfaces (4600, 1500) are sealingly engaged together;
the internal flowpaths (1012) of the second hydraulic valve module (1000) including:
a pressure source flowpath (1013), opening through a pressure source inlet (1003) in the at least one further external surface (1700) of the second valve block (1099) for receiving a supply of hydraulic pressure;
a differential lock pressure supply flowpath (1014) in fluid communication with the pressure source flowpath (1013) and opening through a differential lock pressure outlet (1503) arranged in the second interface surface (1500) of the second valve block (1099) to fluidly communicate with the differential lock pressure inlet (4603) of the first hydraulic valve module (4000) in the connected configuration; and
a tank flowpath (1015), opening through a tank outlet (1002) in the at least one further external surface (1700) of the second valve block (1099) and through a tank inlet (1504) in the second interface surface (1500) of the second valve block (1099), the tank inlet (1504) being arranged to fluidly communicate with the drain outlet (4604) of the first hydraulic valve module (4000) in the connected configuration to relieve hydraulic pressure to tank (64) when a tank (64) is connected to the tank outlet (1002);
the valves of the second hydraulic valve module (1000) being arranged in fluid communication with respective ones of the internal flowpaths (1012) of the second hydraulic valve module (1000) to define:
a parking brake supply circuit (1026), and
a service brake supply circuit (1027);
the parking brake supply circuit (1026) being configured to supply the hydraulic pressure from the pressure source flowpath (1013) to a parking brake pressure outlet (1502), and to prevent return flow from the parking brake pressure outlet (1502) to the pressure source inlet (1003);
the service brake supply circuit (1027) being configured to supply the hydraulic pressure from the pressure source flowpath (1013) to first and second service brake outlets (1001, 1501), and to prevent return flow from the first and second service brake outlets (1001, 1501) to the pressure source inlet (1003);
the parking brake pressure outlet (1502) opening through the second interface surface (1500) of the second valve block (1000) in fluid communication with the parking brake pressure inlet (4602) of the first valve module (4000) in the connected configuration;
the first service brake outlet (1001) opening through the at least one further external surface (1700) of the second valve block (1000) to supply the hydraulic pressure to a first service brake circuit (21) of the vehicle (10) when the first service brake circuit (21) is connected to the first service brake outlet (1001);
the second service brake outlet (1501) opening through the second interface surface (1500) of the second valve block (1000) in fluid communication with the extension inlet (4601) of the first valve module (4000), to supply the hydraulic pressure via the extension flowpath (4010) to a second service brake circuit (22) of the vehicle (10) when the second service brake circuit (22) is connected to the extension outlet (4001) in the connected configuration.

5. A hydraulic valve apparatus according to claim 4, wherein the internal flowpaths (4012) of the valve block (4099) of the first valve module (4000) are formed by machining, and the internal flowpaths (1012) of the second valve block (1099) are formed by casting.

6. A hydraulic valve apparatus according to claim 4, wherein the second valve module (1000) further includes:
an external, third interface surface (1100), the third interface surface (1100) being sealingly connectable with a corresponding surface of a further hydraulic valve module (2000);
a service brake supply valve assembly (1027') configured to control a supply of hydraulic pressure from the pressure source inlet (1003) to each of the first and second service brake outlets (1001, 1501); and
a fan supply valve assembly (1023, 1024) configured to control a supply of hydraulic pressure from the pressure source inlet (1003) via a fan supply outlet (1102) opening through the third interface surface (1100) to drive a cooling fan (31) of the vehicle (10).

7. A method for supplying hydraulic pressure to multiple hydraulic circuits (21, 22, 70) of a vehicle (10), including:
forming a monolithic, first valve block (4099) including an external interface surface (4600), at least one further external surface (4700), and a plurality of internal flowpaths (4012), and
assembling together a plurality of first valves (4020, 4021, 4022) with the first valve block (4099) to form a first valve module (4000), wherein:
the first valves (4020, 4021, 4022) are arranged in fluid communication with respective ones of the internal flowpaths (4012) of the first valve block (4099) to define at least a first functional circuit (4024) for controlling a flow of hydraulic fluid from a first inlet (4602) of the first valve block (4099) to a first outlet (4002) of the first valve block (4099);
the first inlet (4602) of the first valve block (4099) opens through the interface surface (4600) of the first valve block (4099);
the first outlet (4002) of the first valve block (4099) opens through the at least one further external surface (4700) of the first valve block (4099); and
a further respective one (4010) of the internal flowpaths (4012) of the first valve block (4099) forms an extension flowpath (4010) opening through an extension inlet (4601) in the interface surface (4600) of the first valve block (4099) and an extension outlet (4001) in the at least one further external surface (4700) of the first valve block (4099), wherein the extension inlet (4601) is in uninterrupted fluid communication with the extension outlet (4001) via the extension flowpath (4010);
forming a monolithic, second valve block (1099) including an external interface surface (1500), at least one further external surface (1700), and a plurality of internal flowpaths (1012), and
assembling together a plurality of second valves (1020, 1028) with the second valve block (1099) to form a second valve module (1000), wherein:
the second valves (1020, 1028) are arranged in fluid communication with respective ones of the internal flowpaths (1012) of the second valve block (1099) to define at least one, second functional circuit (1026, 1027) for controlling a flow of hydraulic fluid from a second inlet (1003) of the second valve block (1099) to second (1001), third (1502) and fourth (1501) outlets of the second valve block (1099),
the second inlet (1003) and the second outlet (1001) of the second valve block (1099) open through the at least one further external surface (1700) of the second valve block (1099), and
the third and fourth outlets (1502, 1501) of the second valve block (1099) open through the interface surface (1500) of the second valve block (1099); and
sealingly connecting together the interface surfaces (1500, 4600) of the first and second valve blocks (1099, 4099) to place the third (1502) and fourth (1501) outlets of the second valve block (1099) in fluid communication, respectively with the first inlet (4602) and the extension inlet (4601) of the first valve block (4099);
wherein the internal flowpaths (1012) of the second valve block (1099) are formed by casting, and the internal flowpaths (4012) of the first valve block (4099) are formed by machining.

* * * * *